(12) United States Patent
Griepentrog et al.

(10) Patent No.: US 6,318,187 B1
(45) Date of Patent: Nov. 20, 2001

(54) APPARATUS FOR TORQUE MEASUREMENT ON ROTATING TORQUE SHAFTS

(75) Inventors: Gerd Griepentrog; Günter Lins, both of Erlangen; Reinhard Maier, Herzogenaurach, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/556,412

(22) Filed: Apr. 24, 2000

Related U.S. Application Data

(63) Continuation of application No. PCT/DE98/03056, filed on Oct. 19, 1998.

(30) Foreign Application Priority Data

Oct. 23, 1997 (DE) ............................................. 197 46 886

(51) Int. Cl.$^7$ ....................................................... G01L 3/02
(52) U.S. Cl. ...................................................... 73/862.324
(58) Field of Search .............................. 73/800, 862.324

(56) References Cited

U.S. PATENT DOCUMENTS

| | | |
|---|---|---|
| 2,586,540 | 2/1952 | Holden . |
| 4,347,748 | * 9/1982 | Pierson ........................... 73/862.324 |
| 4,962,669 | * 10/1990 | Gernhart et al. ........................ 73/800 |
| 5,001,937 | * 3/1991 | Bechtel et al. .................. 73/862.324 |
| 5,182,953 | * 2/1993 | Ellinger et al. ................. 73/862.335 |
| 5,723,794 | * 3/1998 | Discenzo .............................. 73/800 |

FOREIGN PATENT DOCUMENTS

| | | |
|---|---|---|
| 880 510 | 6/1953 | (DE) . |
| 30 11 700 | 10/1980 | (DE) . |
| 195 23 756 A1 | 1/1997 | (DE) . |
| 44 28 362 C2 | 7/1997 | (DE) . |
| 0 474 149 A2 | 3/1992 | (EP) . |
| 2 093 992 A | 9/1982 | (GB) . |
| 2 125 958 A | 3/1984 | (GB) . |

* cited by examiner

*Primary Examiner*—Max Noori
(74) *Attorney, Agent, or Firm*—Herbert L. Lerner; Laurence A. Greenberg; Werner H. Stemer

(57) ABSTRACT

Torque measurement is required in motors, in particular. It is already known to generate response signals in an axially offset manner at least at two points on a torque shaft by irradiating light onto the rotating torque shaft. An azimuthal offset of those signals produced by the torque over and above a rotary movement must be determined for evaluation purposes. An apparatus according to the invention for torque measurement on rotating torque shafts uses a continuous light beam to generate signals. A torsion-induced deflection of the light beam is geometrically amplified before an evaluation and an azimuthal offset is determined accurately therefrom as a time signal. The apparatus includes a device for generating optical response signals from at least two axially offset reflector systems at the torque shaft of the machine, which have individual concave mirrors in each case.

12 Claims, 4 Drawing Sheets

APPARATUS FOR TORQUE MEASUREMENT ON ROTATING TORQUE SHAFTS

CROSS-REFERENCE TO RELATED APPLICATION

This application is a continuation of copending International Application No. PCT/DE98/03056, filed Oct. 19, 1998, which designated the United States.

BACKGROUND OF THE INVENTION

Field of the Invention

The invention relates to an apparatus for torque measurement on rotating torque shafts, in particular in motors having a torque shaft, in which optical response signals are generated in an axially offset manner at least at two points on the torque shaft by radiating light onto the rotating torque shaft, an azimuthal offset over and above a rotary movement is determined for evaluating the signals, and at least one light source and an associated device for generating and evaluating the response signals are provided.

In practice, it is required to detect the torque output by machines. With electric machines, it should be possible to perform the measurement, in particular, inside the motor housing. However, it is also necessary to be able to determine the torque accurately in the case of the use of machines in industrial plants, for example electric motors for driving rolling mills, with the aim there being to perform the measurement outside the motor.

The torque of rotating machines is frequently measured by torque measuring shafts which are mounted between the motor and the driven machine. In that case, the torque measuring shaft includes a spindle, the torsion of which is detected through a strain gauge, for example. The signal transmission is performed in that case through sliprings or telemetric methods.

It has already been proposed to determine the torque through micromechanically produced capacitors which are fitted on the torque shaft and have a capacitance that is varied by the torsion. However, that also requires telemetric signal transmission. In addition, it is also possible to use configurations with surface wave filters for torsion measurement, which is described, for example, in German Published, Non-Prosecuted Patent Application DE 195 32 601 A1.

Furthermore, German Patent DE 44 28 362 C2 proposes a method for contactless detection of the movement, in particular the rotary movement, of a machine part. To be specific, a pulsed light beam is directed onto a measuring point at which markings having a defined length that are disposed on the machine part sequentially in the direction of movement thereof pass by, and light reflected by the markings is detected and evaluated. That method develops a method previously known from UK Patent Application GB 2 093 991 A in such a way that the light beam is pulsed at a prescribed frequency and focused in such a way that upon striking the markings it generates a sequence of light points which can be counted in a simple way. It is also possible in that case to measure torque through the use of a twofold, axially offset measurement. The pulsed light beam is advantageously generated by a laser. In addition, UK Patent Application GB 2 093 992 A likewise discloses a method which operates with pulsed lasers and in which irradiation is performed in an axially offset manner at two points on the rotating shaft and the torque is determined by defining a temporal reference point for the axial offset of the response signals. That method has proved not to be functional in practice.

U.S. Pat. No. 2,586,540 discloses a torsion meter in which the shaft is optically scanned. However, German Published, Non-Prosecuted Patent Application 30 11 700 discloses an apparatus for load-dependent measurement of the torque of a torque shaft in which the torque shaft is irradiated with light in an axially offset manner and subareas which reflect radiation supply torque-dependent response signals with the twisting of the torque shaft.

In addition, German Published, Non-Prosecuted Patent Application DE 195 23 756 A1 discloses a sensor which detects the force or the torque on a working machine. The sensor is constructed as an optoelectric sensor that generates at least one light path in the case of which the quantity of light transmitted through the light path, or the magnitude and variation thereof, are a function of the force of the torque on the machine.

SUMMARY OF THE INVENTION

It is accordingly an object of the invention to provide an apparatus for torque measurement on rotating torque shafts, which overcomes the hereinafore-mentioned disadvantages of the heretofore-known manifold devices of this general type and which provides a practical apparatus for torque measurement that, in particular, is to be able to be used in electric machines.

With the foregoing and other objects in view there is provided, in accordance with the invention, an apparatus for torque measurement of a rotating torque shaft of a machine, in particular motors which have a torque shaft, comprising at least two axially offset reflector systems disposed at the torque shaft; each of the reflector systems having a respective light source, the light sources generating axially offset optical response signals at least at two points of the torque shaft by radiating light onto the rotating torque shaft; each of the reflector systems having an individual concave mirror associated with a respective one of the light sources; and each of the reflector systems having an evaluation device associated with a respective one of the concave mirrors, the evaluation devices generating and evaluating the response signals by determining an azimuthal offset beyond a rotary movement.

In accordance with another feature of the invention, the concave mirror of each of the reflector systems is one of a prescribed number of similar concave mirrors concentric with the torque shaft. In accordance with a further feature of the invention, there is provided a reflection disk connected to the torque shaft and having a periphery, and the concave mirrors are fitted near the periphery of the reflection disk. In accordance with an added feature of the invention, the torque shaft has a periphery, and the concave mirrors are fitted at the periphery of the torque shaft.

In accordance with an additional feature of the invention, the light source is a continuously emitting laser. In accordance with yet another feature of the invention, the light source is a light-emitting diode.

In accordance with yet a further feature of the invention, there are provided optical elements for beam focusing which are disposed between the light source and the concave mirrors.

In accordance with yet an added feature of the invention, there is provided a device for optically separating irradiated and reflected light beams.

In accordance with yet an additional feature of the invention, there is provided an optical receiver for evaluating a reflected light beam. In accordance with again another feature of the invention, the receiver is a double photodiode.

In accordance with again a further feature of the invention, the double photodiode has two diode halves, and a comparator determines an exact triggering instant when the light signal is equally strong on both of the diode halves.

In accordance with a concomitant feature of the invention, the light source is an optical transmitter, the evaluation device has a receiver, and a scanning system including the optical transmitter and the receiver is accommodated in end shields of a machine.

Mirror configurations for detecting torsion have certainly already been proposed in German Patent No. 880 510. The shaft therein is partially surface-ground for that purpose.

In addition to a device for generating response signals, the apparatus for torque measurement according to the invention includes a device for detection and evaluation. The device for generating the response signals includes at least two mutually axially offset reflector systems on the torque shaft of the machine, which in each case have individual concave mirrors. Each reflector system is formed from a prescribed number of similar concave mirrors which are either fitted on a disk, connected to the torque shaft, as a reflecting disk, or are fitted, for example, on the rotor of the motor in such a way that they lie on a circle concentrically surrounding the axis of the torque shaft.

The novel apparatus is accurate and safe against overloading. It is possible to measure acceleration and braking torques in both directions of rotation. It is advantageous that, as in the case of the prior art already mentioned by way of introduction, there is no need for external measuring devices, and that a speed signal is also available, equally above the torque signal. It is possible to implement sensitivity enhancement which further improves the possibility of evaluation as compared with the prior art, by using concave mirrors as reflectors.

Other features which are considered as characteristic for the invention are set forth in the appended claims.

Although the invention is illustrated and described herein as embodied in an apparatus for torque measurement on rotating torque shafts, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
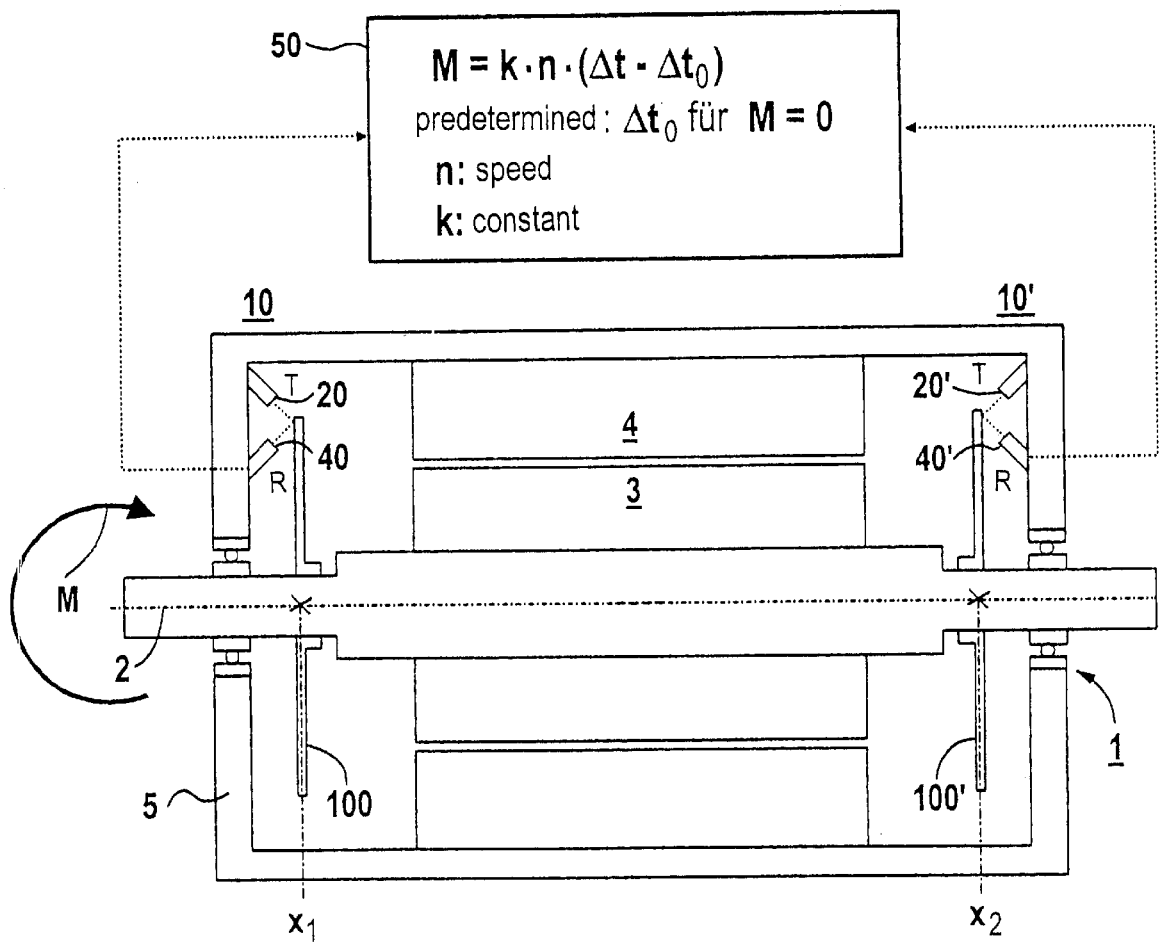
FIG. 1 is a diagrammatic, elevational view of an enclosed electric motor having a measuring device located therein for detecting torque, as well as an external evaluation unit.

Referring now in detail to the figures of the drawings, in which parts that are identical or operate identically have corresponding reference numerals and in which the figures are jointly described in part, and first, particularly, to FIG. 1 thereof, there is seen, in particular, a diagrammatic illustration of an electric motor 1 that essentially includes a rotating shaft 2 with a rotor 3 and an associated stator 4 in an enclosed housing 5. The known mode of operation of the electric motor follows from the conventional construction of rotor and stator stacks.

It has been necessary to date to fit a measuring device externally on the torque shaft 2 in order to measure the speed and/or torque of such an electric motor 1. In the example according to FIG. 1, it is proposed to advantageously provide the measuring device inside the housing 5 and to undertake evaluation in an externally associated processor 50.

The basic concept of the configuration in accordance with FIG. 1 is to detect the torsion of the shaft 2 through the use of at least two light barriers which are fitted at two different axial positions x1 and x2. Such light barriers can be constructed in principle as reflecting light barriers or interrupter light barriers. A response signal is generated when a reflector system 10 that is permanently connected to the shaft 2 and revolves about an axis of the shaft 2 as it rotates closes the light barrier, or when an interrupter which is disposed in a similar way interrupts the light barrier.

When, in the case of a configuration in accordance with FIG. 1, the instances at which the reflector system 10 or a reflector system 10' generate signals are denoted by reference symbols $t_1$ and $t_2$, a difference $$\Delta t = t_2 - t_1 = \Delta t_0 + \Delta t_M \qquad (1)$$

results as a measured variable.

In this case, the difference $\Delta t$ is composed of a torque-independent component $\Delta t_0$, which is produced by a possibly structure-induced azimuthal offset of the reflector systems 10 and 10' as well as constant propagation time differences, and a component $$\Delta t_M = \frac{M}{k \cdot n}, \qquad (2)$$

which is produced by the torsion of the shaft 2 caused by a torque M, and is proportional to a quotient M/n of the torque M and a speed n, in which k denotes a constant of proportionality. The torque to be determined is yielded therefrom as $$M = kn(\Delta t - \Delta t_0). \qquad (3)$$

The speed is obtained from the frequency at which the reflector systems 10 and 10' generate signals.

Figure 2:
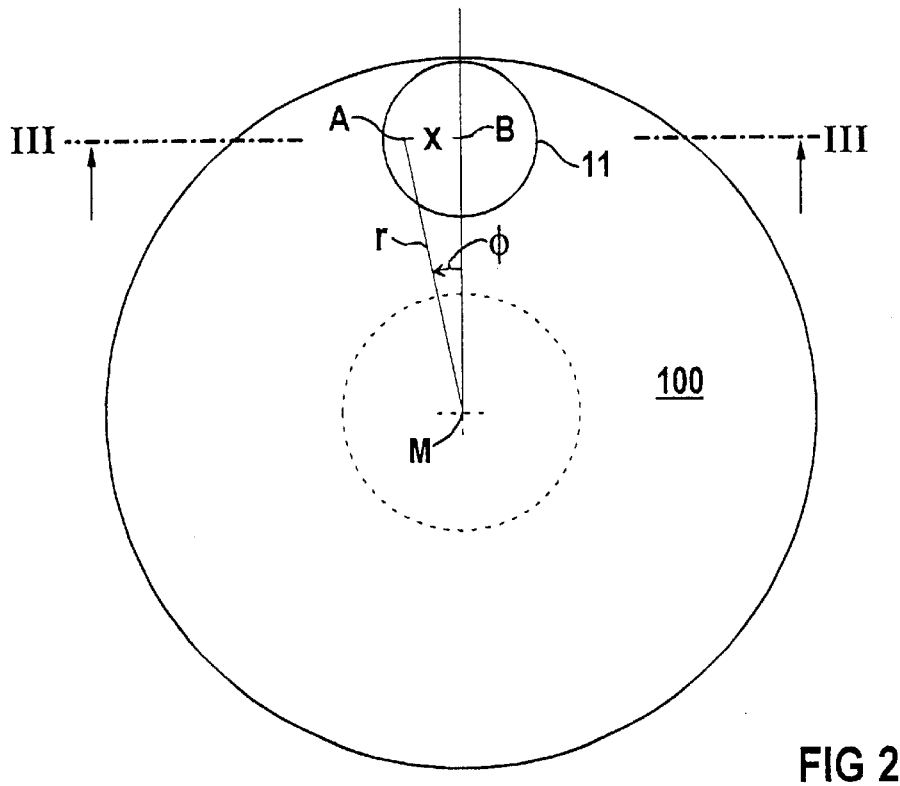
FIG. 2 is an elevational view illustrating a mode of operation of a concave mirror on a reflecting disk.
Figure 3:
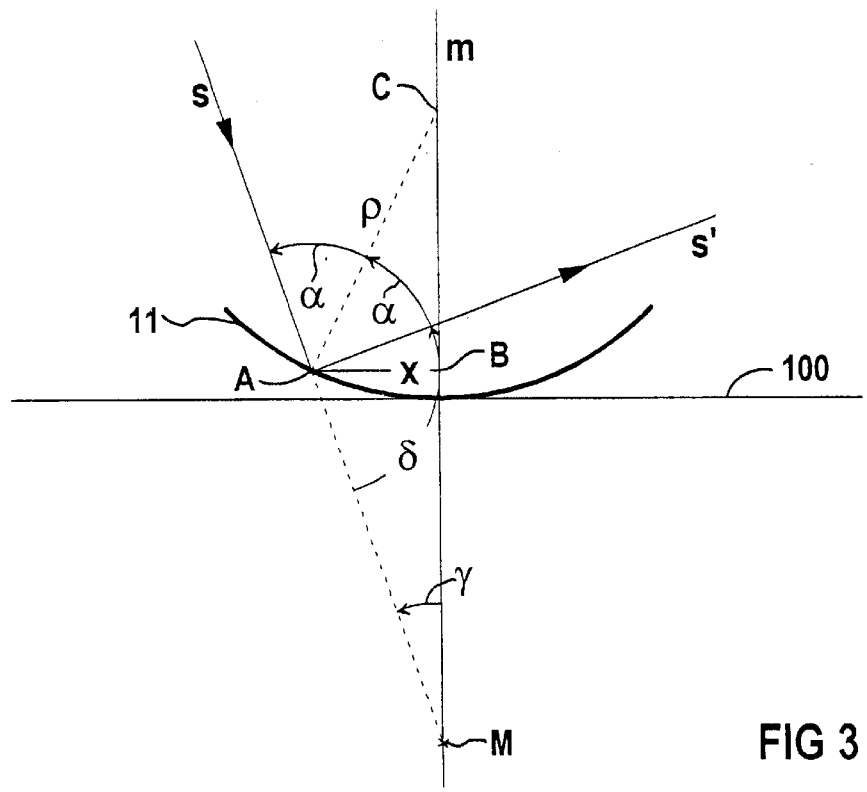
FIG. 3 is a sectional view taken along a line III—III in FIG. 2.
Figure 4:
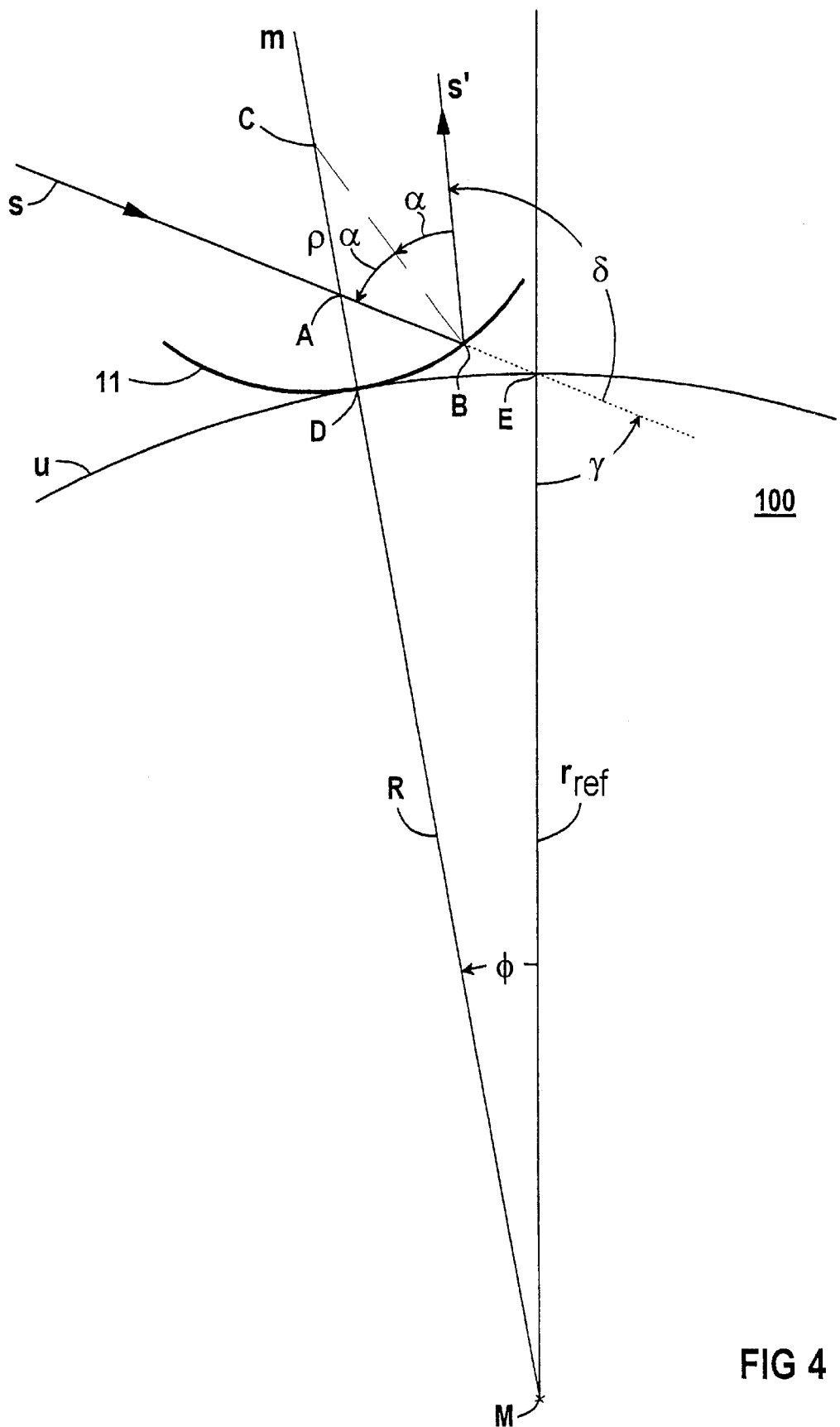
FIG. 4 is an elevational view illustrating a mode of operation of a concave mirror on a periphery of a shaft.

A transmitter for optical radiation is denoted by reference numerals 20 and 20' and an associated receiver is denoted by reference numerals 40 and 40' in the two respective axially offset reflector systems 10 and 10' of FIG. 1. In a practical implementation, instead of using one reflector system 10 or 10' or an interrupter in each case, it is possible to place a number N of reflectors 11, 11', 11", ... or interrupters on a circle, concentrically surrounding the shaft 2, on a disk 100 in each case, as is seen in FIGS. 2, 3 and 4. It is possible as a result to measure the torque and the number of revolutions during one revolution N, as has also already been implemented in the prior art. In this case, with reference to FIG. 5, it is expedient to use the transmitter 20, which is advantageously implemented by a continuously emitting laser or a suitable light-emitting diode, to focus the optical radiation through a lens 25, to irradiate it in a focused manner onto at least one of the reflectors 11, 11', 11", . . . and to subsequently feed the reflected radiation to the receiver 40.

Due to the extremely low shaft torsion, which is on the order of magnitude of 0.05° for electric motors given a nominal torque, it is essential for the functioning of the configuration described that the reflectors be configured and disposed in such a way that the beam deflection is a multiple of the torsion angle of the shaft. This is achieved by using concave mirrors, as explained for the exemplary embodiment of FIG. 1 with the aid of FIGS. 2 and 3.

FIGS. 2 and 3 show the reflecting disk 100 on which a mirror 11 with a radius of curvature ρ is disposed at a distance r from a center point M, in such a way that a central perpendicular m thereof is perpendicular to the disk 100. FIG. 3 shows a section taken along a line III—III.

An incident light beam s strikes the mirror 11 at a point A in such a way that its extension encloses an angle γ with the central perpendicular m. In FIG. 2, the position of the point A is indicated by an angle φ and the distance r from the center point M of the disk 100. A distance x is small in comparison with 2πr, so that it holds to a good approximation that x=rφ (angle φ in radian measure). A reflected beam s' is deflected from the direction of the incident beam s by an angle δ. It follows from elementary geometrical considerations that:

$$\delta = \pi - 2\gamma + 2\arcsin r \frac{\phi}{\rho} \quad (4)$$

An angular sensitivity, defined as a derivative of the deflection angle δ with respect to the angle of rotation φ, is yielded as:

$$\frac{d\delta}{d\phi} = 2 \frac{r}{\rho\sqrt{1 - \left(\frac{r\phi}{\rho}\right)^2}} \quad (5)$$

In typical applications, it is the case that, for example, r=100 mm and ρ=25 mm. In the case of φ=0, the result is dδ/dφ=8. Thus, a change in the angle φ due to the rotation of the shaft is expressed as an eightfold change in the deflection angle δ.

In the case of an infinitely large radius of curvature (ρ→∞), equation (4) is transformed into an expression for deflection by a plane mirror:

$$\delta = \pi - 2\gamma \quad (6).$$

It follows from equation (6) that in the case of a plane mirror with an axial mounting which is presupposed in this case, the deflection δ does not depend on the angle φ, and therefore it does not depend on the position of the disk 100 which carries the mirror 11. Rather, light is reflected too long, and specifically always at the same angle, as the beam strikes the plane mirror. In this exemplary embodiment, the construction of the reflector as a concave mirror is therefore absolutely essential for the dependence of the deflection angle on the angle of rotation and thus for the functioning of the device according to the invention.

In another exemplary embodiment, which is partially and diagrammatically represented in FIG. 4, a mirror 11 with a radius of curvature ρ is disposed on a periphery u of a motor shaft in such a way that its central perpendicular m runs radially with reference to a center point M of a circular cross section of the shaft and encloses an angle φ with a likewise radial reference line $r_{ref}$. If appropriate, a non-radial mounting of the mirror is possible on the periphery u, in which case a radius of the shaft and lines of symmetry of the mirror do not correspond.

The following conditions can be derived from the geometrical illustration of FIG. 4: Let a light beam s be given which encloses an angle γ with the reference line $r_{ref}$. Let the state of movement of the motor shaft be such that the beam strikes the mirror 11 at a point B and leaves it as the reflected beam s'. The deflection angle δ, which specifies the change in direction of the beam s upon reflection, is a function of the angle of rotation φ, which varies with the rotation of the shaft. Elementary trigonometrical considerations lead to the result that the beam reflection δ is given in this case by:

$$\delta = \pi - 2\arcsin\left\{\sin(\gamma - \phi) - \frac{R\phi}{\rho}\cos(\gamma - \phi)\right\}, \quad (7)$$

wherein R is the radius of the cross section of the shaft. The sensitivity is defined as:

$$\frac{d\delta}{d\phi} = 2\chi \quad (8)$$

where $$\chi = \frac{\left(\cos(\gamma - \phi)\left(1 + \frac{r}{\rho}\right) + \frac{R\phi}{\rho}\sin(\gamma - \phi)\right)}{\sqrt{1 - \left\{\sin(\gamma - \phi) - \frac{R\phi}{\rho}\cos(\gamma - \phi)\right\}^2}} \quad (8a)$$

In the case of an infinitely large radius of curvature ρ, equation (5) is transformed into the corresponding expression for a plane mirror:

$$\left.\frac{d\delta}{d\phi}\right|_{Plane} = 2 \quad (9)$$

The quotient χ of equations (8) and (9) specifies a factor by which the sensitivity is raised through the use of a concave mirror in comparison with a plane mirror.

As an example, given a shaft radius of R=100 mm, a radius of curvature ρ=25 mm, γ=45° and φ=0, the result is χ=5. Since the sensitivity of the configuration with a plane mirror according to equation (9) is 2, in the example under consideration the use of a concave mirror results in a beam deflection which corresponds to ten times the change in the angle of rotation φ of the shaft.

According to the illustration in FIG. 2, individual concave mirrors 11, 11', 11" . . . can be aligned either axially or radially running concentrically round an edge of the disk 100. The transmitter 20 for optical radiation should advantageously emit a thin light beam which is as parallel as possible, such as is generated by a laser, for example. The beam can be expanded or focused by a suitable optical system, or else also be guided through an optical conductor. In the interest of a very high resolution, the receiver 40 is intended to have as small a receiving surface as possible. A further rise in the resolution is achieved, for example, by using two elements 41, 42 of a photodiode array as the receiver 40 having an extent of 25 μm and as narrow as possible a gap between the diodes, which is illustrated by way of example in FIG. 5.

Figure 5:
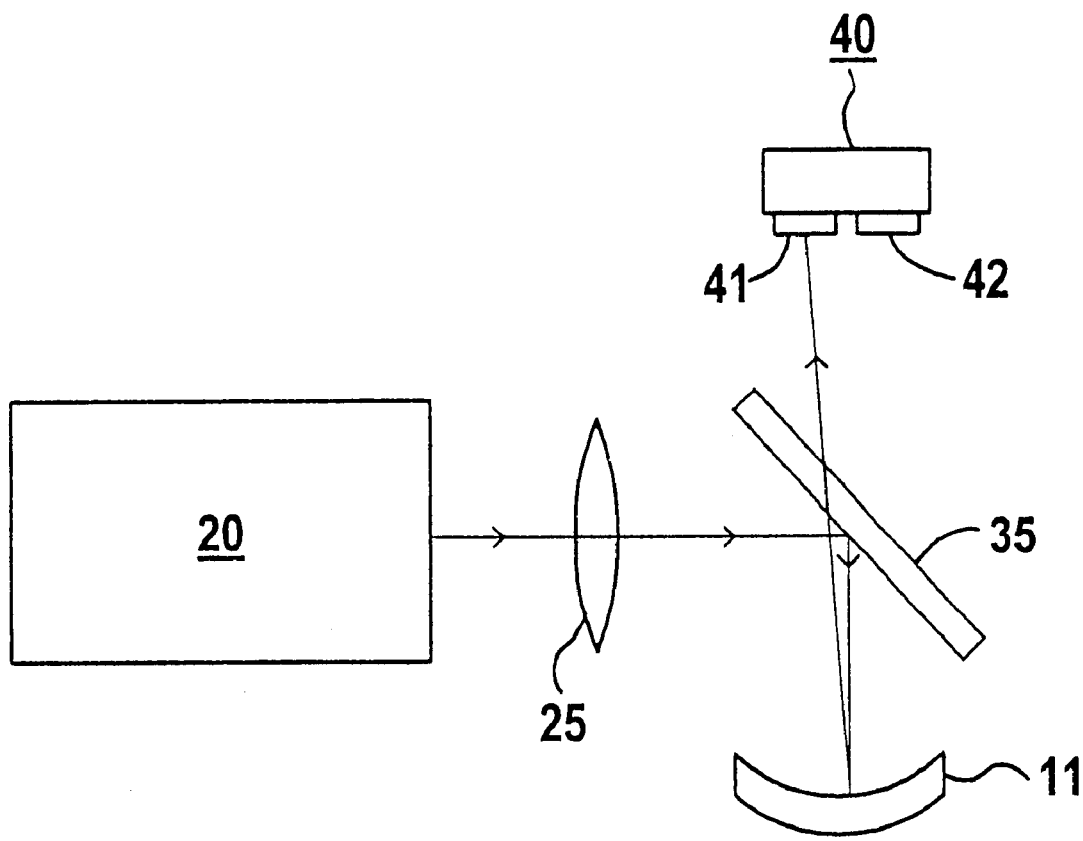
FIG. 5 is an elevational view illustrating a configuration for beam splitting for use in a device according to FIG. 1.

In the embodiment illustrated in FIG. 5, a semi-transparent mirror 35 is provided as an additional device for simplifying the signal evaluation. An accurate time mark, which is set in order to determine extremely small torques caused by slight wave torsions, can be achieved by virtue of the fact that the differential signal of the two diodes 41 and 42 vanishes. The zero crossing of the differential signal of the two receiver elements 41 and 42 is thus defined exactly as a respective time mark.

The scanning systems of the associated apparatus, which include the optical transmitter 20 and the receiver 40, can advantageously be fitted in an end shield of the motor 1 for the method described. The processor 50 according to FIG. 1 determines the torque M in accordance with the relationships specified above, and can also undertake corrections, if appropriate.

We claim:

1. An apparatus for torque measurement of a rotating torque shaft of a machine, comprising:

at least two axially offset reflector systems disposed at the torque shaft;

each of said reflector systems having a respective light source, said light sources generating axially offset optical response signals at least at two points of the torque shaft by radiating light onto the rotating torque shaft;

each of said reflector systems having an individual concave mirror associated with a respective one of said light sources; and each of said reflector systems having an evaluation device associated with a respective one of said concave mirrors, said evaluation devices generating and evaluating the response signals by determining an azimuthal offset beyond a rotary movement.

2. The apparatus according to claim 1, wherein said concave mirror of each of said reflector systems is one of a prescribed number of similar concave mirrors concentric with the torque shaft.

3. The apparatus according to claim 2, including a reflection disk connected to the torque shaft and having a periphery, said concave mirrors fitted near said periphery of said reflection disk.

4. The apparatus according to claim 2, wherein the torque shaft has a periphery, and said concave mirrors are fitted at the periphery of the torque shaft.

5. The apparatus according to claim 1, wherein said light source is a continuously emitting laser.

6. The apparatus according to claim 1, wherein said light source is a light-emitting diode.

7. The apparatus according to claim 1, including optical elements for beam focusing disposed between said light source and said concave mirrors.

8. The apparatus according to claim 5, including a device for optically separating irradiated and reflected light beams.

9. The apparatus according to claim 1, including an optical receiver for evaluating reflected light beam.

10. The apparatus according to claim 9, wherein said receiver is a double photodiode.

11. The apparatus according to claim 10, wherein said double photodiode has two diode halves, and a comparator determines an exact triggering instant when the light signal is equally strong on both of said diode halves.

12. The apparatus according to claim 1, wherein said light source is an optical transmitter, said evaluation device has a receiver, and a scanning system including said optical transmitter and said receiver is accommodated in end shields of a machine.

* * * * *